(12) United States Patent
Anderson

(10) Patent No.: US 7,459,064 B2
(45) Date of Patent: *Dec. 2, 2008

(54) SOLAR ELECTROLYSIS POWER SOURCE

(75) Inventor: Christopher M. Anderson, Simi Valley, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 640 days.

This patent is subject to a terminal disclaimer.

(21) Appl. No.: 10/721,928

(22) Filed: Nov. 24, 2003

(65) Prior Publication Data

US 2005/0109393 A1    May 26, 2005

(51) Int. Cl.
*C25B 9/00* (2006.01)
(52) U.S. Cl. ............. 204/228.1; 204/228.2; 204/228.4; 204/228.5; 204/228.6; 204/278; 136/206; 136/244; 136/291; 429/21; 429/25

(58) Field of Classification Search ............. 429/21, 429/25; 204/278, 275.1, 228.1, 228.2, 228.4, 204/228.5, 228.6; 136/291, 244, 206
See application file for complete search history.

(56) References Cited

U.S. PATENT DOCUMENTS

| 2002/0067753 A1* | 6/2002 | Ullman et al. ............. 372/89 |
| 2004/0072040 A1* | 4/2004 | Duffy et al. ............. 429/21 |
| 2004/0205032 A1* | 10/2004 | Routtenberg et al. ....... 705/400 |
| 2005/0109394 A1* | 5/2005 | Anderson ............. 136/291 |

* cited by examiner

*Primary Examiner*—Bruce F Bell
(74) *Attorney, Agent, or Firm*—Kinney & Lange, P.A.

(57) ABSTRACT

A solar electrolysis power source includes a solar panel, an electrolysis unit, a hermetically sealed compressor, a hydrogen tank, and a fuel cell. By utilizing the electrolysis of water powered by solar energy, the solar electrolysis power source enables a safe, environmentally benign, and cost-effective method of power generation. Furthermore, by combining the production, the compression, the storage of hydrogen, as well as the delivery of the hydrogen to the fuel cell in one hermetically sealed unit currently existing problems with the production, storage delivery, and refueling of hydrogen can be eliminated. The solar electrolysis power source uses hydrogen gas that is hermetically sealed from production to use.

26 Claims, 2 Drawing Sheets

SOLAR ELECTROLYSIS POWER SOURCE

BACKGROUND OF THE INVENTION

The present invention generally relates to power sources and, more particularly, to a power source that utilizes the electrolysis of water and solar energy and to a method for generating power by utilizing the electrolysis of water and solar energy.

The current world economy is mostly a fossil fuel economy. Fossil fuels such as petroleum products, for example, gasoline and diesel are currently used almost exclusively to power automobiles, trains, planes, etc. A huge percentage of current power plants use oil, natural gas, and coal for their fuel. The usage of fossil fuel creates problems, such as air pollution, environmental pollution, global warming, and dependency on availability of these natural resources. Furthermore, the fossil fuels are limited while the demand is increasing. Therefore, new forms for energy storage and production must be found.

With the development of hydrogen-powered fuel cells, a shift from the fossil fuel economy towards a hydrogen economy has begun. Fuel cells chemically combine hydrogen with oxygen to generate electricity. Hydrogen powered fuel cells offer many advantages. They can run on a combustion-free process that is safe, quiet, reliable and, most importantly, clean. Fuel cells don't contribute to smog or acid rain. Heat and water can be the only byproducts of the electrochemical process that takes place within a fuel cell.

However, currently the operation of hydrogen powered fuel cells, for example, in hydrogen powered vehicles or portable power equipment, is not practical due to the lack of production, transportation, and dispensing infrastructure of hydrogen gas. In addition, filling of hydrogen gas into storage tanks is a dangerous process.

There has, therefore, arisen a need to provide an alternative power source that is independent from fossil fuels. There has further arisen a need to provide a power source that utilizes hydrogen in an economical way. There has also arisen a need to provide a power source that makes the use of hydrogen gas practical and safe. There has still further arisen a need to provide a power source that makes the use of hydrogen powered fuel cells possible in remote geographic areas where no conventional electricity is available. There has still further arisen a need to provide a power source that makes the use of hydrogen powered fuel cells possible for portable power equipment. There has still further arisen a need to provide a power source that uses hydrogen but eliminates the problems associated with the production and transportation of hydrogen gas.

As can be seen, there is a need for a power source that enables the use of hydrogen to power, for example, vehicles or portable power equipment. Furthermore, there is a need for a power source that eliminates the dangerous process of filling hydrogen gas into storage tanks. Also, there is a need for a power source that provides electricity while minimizing the use of fossil fuels. Still further, there is a need to provide a power source that eliminates problems currently associated with the production, storage of the hydrogen gas, as well as the transportation of the hydrogen gas to a fuel cell. Moreover, there is a need to provide a method for generating power without fossil fuels or with minimal use of fossil fuels.

SUMMARY OF THE INVENTION

The present invention provides a power source that utilizes the electrolysis of water and solar energy to produce and deliver hydrogen gas to a hydrogen powered fuel cell. The present invention further provides a solar electrolysis power source that is suitable for, but not limited to, use in hydrogen-powered vehicles, for example, automobiles, buses or ships. The present invention still further provides a solar electrolysis power source that is suitable for, but not limited to, use in portable power tools and equipment. The present invention still further provides a method for generating power by utilizing the electrolysis of water and solar energy.

In one aspect of the present invention, a solar electrolysis power source comprises a source of water, an electrolysis unit, a solar panel, a hermetically sealed compressor, a hydrogen tank, and a fuel cell. The electrolysis unit is connected with the source of water and receives water from the source of water. The electrolysis unit provides the electrolysis of the water and produces hydrogen gas and oxygen gas. The solar panel is connected with the electrolysis unit. The solar panel receives solar rays and provides electrical energy to the electrolysis unit. The hermetically sealed compressor is connected with the electrolysis unit. The hermetically sealed compressor receives the hydrogen gas from the electrolysis unit. The hydrogen tank is connected with the hermetically sealed compressor and receives the hydrogen gas from the hermetically sealed compressor. The fuel cell is connected with the hydrogen tank. The fuel cell receives the hydrogen gas from the hydrogen tank.

In another aspect of the present invention, a solar electrolysis power source comprises source of water, an electrolysis unit, a solar panel, an AC power source, a hermetically sealed compressor, a hydrogen tank, a fuel cell, and a system controller. The electrolysis unit is connected with the source of water, receives water from the source of water, provides the electrolysis of the water, and produces hydrogen gas and oxygen gas. The solar panel is connected with the electrolysis unit, receives solar rays, and provides electrical energy to the electrolysis unit. The AC power source is connected with the electrolysis unit and provides electrical energy to the electrolysis unit. The hermetically sealed compressor is connected with the electrolysis unit and receives the hydrogen gas from the electrolysis unit. The hydrogen tank is connected with the hermetically sealed compressor and receives the hydrogen gas from the hermetically sealed compressor. The fuel cell is connected with the hydrogen tank and receives the hydrogen gas from the hydrogen tank. The system controller is connected with the solar panel, the AC power source, the electrolysis unit, the hermetically sealed compressor, and the hydrogen tank.

In still another aspect of the present invention, a solar electrolysis power source comprises a water tank holding water, an electrolysis unit, a solar panel, an AC power source, a hermetically sealed compressor, a hydrogen tank, a fuel cell, a system controller, and a data and control bus. The electrolysis unit is connected with the source of water and receives water from the source of water, provides the electrolysis of the water, and produces hydrogen gas and oxygen gas. The solar panel is connected with the electrolysis unit, receives solar rays, and provides electrical energy to the electrolysis unit. The AC power source is connected with the electrolysis unit and provides electrical energy to the electrolysis unit. The hermetically sealed compressor is connected with the electrolysis unit and receives the hydrogen gas from the electrolysis unit. The hydrogen tank is connected with the hermetically sealed compressor and receives the hydrogen gas from the hermetically sealed compressor. The fuel cell is connected with the hydrogen tank and receives the hydrogen gas from the hydrogen tank. The system controller is connected with the solar panel, the AC power source, the electrolysis unit, the hermetically sealed compressor, and the hydrogen tank. The data and control bus connects the system controller with the pH sensor, the water level sensor, the water fill valve, the electrolyte fill valve, the oxygen vent valve, the hydrogen tank fill valve, the hydrogen tank output valve, the pressure gauge of the hydrogen tank, and the hermetically sealed compressor. The electrolysis unit comprises an electrolysis chamber including an oxygen chamber and a hydrogen chamber, a cathode located within the hydrogen chamber, an anode located within the oxygen chamber, a pH sensor located within the electrolysis chamber, a water level sensor located within the electrolysis chamber, a water fill inlet including a water fill valve, an electrolyte tank containing an electrolyte and including an electrolyte fill inlet and an electrolyte fill valve, an oxygen vent including an oxygen vent valve, and a hydrogen vent. The electrolysis chamber is connected with the water tank and receives water from the water tank. The cathode is connected with the solar panel creating a negative charge at the cathode. The anode is connected with the solar panel creating a positive charge at the anode. The water fill inlet connects the electrolysis chamber with the source water tank. The electrolyte fill inlet connects the electrolyte tank with the electrolysis chamber. The oxygen vent connects the oxygen chamber of the electrolysis chamber with the outside atmosphere. The hydrogen vent connects the hydrogen chamber of the electrolysis chamber with the hermetically sealed compressor. The hydrogen tank comprises a hydrogen tank fill valve, a hydrogen tank output valve, and a pressure gauge. The hydrogen tank fill valve is located between the hermetically sealed compressor and the hydrogen tank. The hydrogen tank output valve is located between the hydrogen tank and the fuel cell. The pressure gauge indicates the pressure of the hydrogen gas stored inside the hydrogen tank.

In a further aspect of the present invention, a hydrogen-powered vehicle comprises a solar electrolysis power source that is mounted on the vehicle. The solar electrolysis power source comprises a water tank holding water, an electrolysis unit, a solar panel, an AC power source, a hermetically sealed compressor, a hydrogen tank, a fuel cell, and a system controller. The electrolysis unit is connected with the source of water, receives water from the source of water, provides the electrolysis of the water and produces hydrogen gas and oxygen gas. The solar panel is connected with the electrolysis unit, receives solar rays, and provides electrical energy to the electrolysis unit. The AC power source is connected with the electrolysis unit and provides electrical energy to the electrolysis unit. The hermetically sealed compressor is connected with the electrolysis unit and receives the hydrogen gas from the electrolysis unit. The hydrogen tank is connected with the hermetically sealed compressor and receives the hydrogen gas from the hermetically sealed compressor. The fuel cell is connected with the hydrogen tank and receives the hydrogen gas from the hydrogen tank. The system controller is connected with the solar panel, the AC power source, the electrolysis unit, the hermetically sealed compressor, and the hydrogen tank.

In still another aspect of the present invention, a method for generating power by utilizing the electrolysis of water and solar energy comprises the steps of: providing a solar panel that receives solar rays and generates electrical energy; providing a source of water; connecting an electrolysis unit including an anode and a cathode with the solar panel and the source of water; filling the electrolysis unit with the water; adding an electrolyte to the water in the electrolysis unit; providing the electrical energy generated by the solar panel to the anode and the cathode of the electrolysis unit; producing oxygen gas and hydrogen gas with the electrolysis unit; connecting a hermetically sealed compressor with the electrolysis unit, directing the hydrogen gas to the hermetically sealed compressor; providing a hydrogen tank and connecting the hydrogen tank with the hermetically sealed compressor; pumping the hydrogen gas into the hydrogen tank with the hermetically sealed compressor; connecting a fuel cell with the hydrogen tank; delivering the hydrogen gas from the hydrogen tank to the fuel cell; and generating electrical energy with the fuel cell.

In still another aspect of the present invention, a method for generating power by utilizing the electrolysis of water and solar energy comprises the steps of: providing a solar electrolysis power source; generating electrical energy with the solar panel; filling the electrolysis unit with the water; providing the electrical energy generated by the solar panel to the electrolysis unit; producing oxygen gas and hydrogen gas with the electrolysis unit through electrolysis of the water; directing the hydrogen gas to the hermetically sealed compressor; pumping the hydrogen gas into the hydrogen tank with the hermetically sealed compressor; delivering the hydrogen gas from the hydrogen tank to the fuel cell; and generating electrical energy with the fuel cell. The solar electrolysis power source comprises a source of water, an electrolysis unit, a solar panel, an AC power source, a hermetically sealed compressor, a hydrogen tank, a fuel cell, and a system controller. The electrolysis unit is connected with the source of water and receives water from the source of water, provides the electrolysis of the water, and produces hydrogen gas and oxygen gas. The solar panel is connected with the electrolysis unit and receives solar rays and provides electrical energy to the electrolysis unit. The AC power source is connected with the electrolysis unit and provides electrical energy to the electrolysis unit. The hermetically sealed compressor is connected with the electrolysis unit and receives the hydrogen gas from the electrolysis unit. The hydrogen tank is connected with the hermetically sealed compressor and receives the hydrogen gas from the hermetically sealed compressor. The fuel cell is connected with the hydrogen tank and receives the hydrogen gas from the hydrogen tank. The system controller is connected with the solar panel, the AC power source, the electrolysis unit, the hermetically sealed compressor, and the hydrogen tank.

These and other features, aspects and advantages of the present invention will become better understood with reference to the following drawings, description and claims.

DETAILED DESCRIPTION OF THE INVENTION

Figure 1:
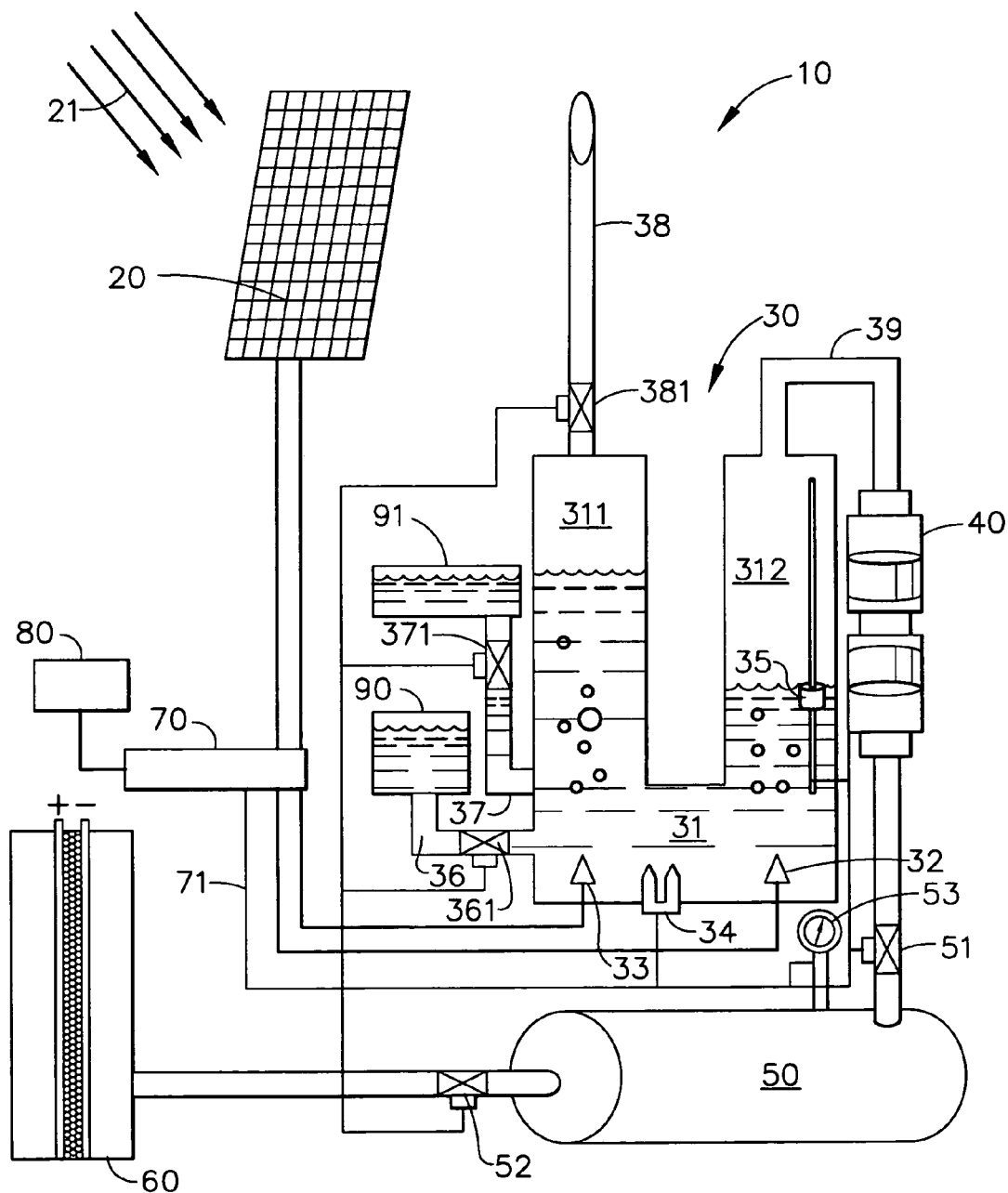
FIG. 1 is a schematic view of a solar electrolysis power source according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides a solar electrolysis power source that utilizes the electrolysis of water and solar energy to produce electricity. Contrary to the known prior art, the solar electrolysis power source includes devices for production of hydrogen gas from water using electrolysis, compression of the hydrogen gas, storage of the hydrogen gas, and delivery of hydrogen to a fuel cell, all in a hermetically sealed unit. The solar electrolysis power source as in one embodiment of the present invention may be used, for example, for hydrogen-powered vehicles, such as automobiles, buses or ships, and for portable power equipment, such as power tools.

In one embodiment, the present invention provides a solar electrolysis power source that includes an electrolysis unit that facilitates the electrolysis of water and therefore the production of hydrogen gas and that is powered by solar energy. Water can be a pollution free source of hydrogen. By using solar energy for the electrolysis, the production of hydrogen is independent from the use of fossil fuels that are currently used as main source for energy production. By utilizing the electrolysis of water powered by solar energy, a safe, environmentally benign, and cost-effective method of hydrogen gas production is provided. The hydrogen gas produced in the electrolysis unit is an energy storage medium as well as a fuel. Therefore, a vehicle powered by a solar electrolysis power source as in one embodiment of the present invention would produce fuel during daytime even if not in operation, which is an advantage over, for example, prior art battery operated vehicles.

An embodiment of the present invention further provides a hermetically sealed compressor for compressing the hydrogen gas such that it may be stored in a hydrogen tank. By providing the hydrogen gas production, compression, and storage in a hermetically sealed unit as in one embodiment of the present invention, the safety hazards connected with the filling of hydrogen gas into storage tanks as currently done, can be eliminated.

An embodiment of the present invention further provides a hydrogen powered fuel cell for producing electricity. The hydrogen-powered fuel cell may be connected directly with the hydrogen storage tank as in one embodiment of the present invention. By combining the production, the compression, the storage, and the delivery of the hydrogen to the fuel cell in one hermetically sealed unit as in one embodiment of the present invention, currently existing problems with the production, storage delivery, and refueling of hydrogen can be eliminated. The hydrogen gas is hermetically sealed from production to use, eliminating currently existing refueling safety hazards. The solar electrolysis power source as in one embodiment of the present invention does not depend on a hydrogen-dispensing infrastructure, which presently does not exist. Furthermore, there is no need to transport the hydrogen gas over long distances, since it is produced where needed.

An embodiment of the present invention further provides a solar electrolysis power source as in one embodiment of the present invention that includes a solar energy powered electrolysis unit, a compressor, a hydrogen storage tank and a hydrogen powered fuel cell in one hermetically sealed unit. Therefore, the production, compression, storage and delivery to a fuel cell for production of electricity is provided in one hermetically sealed unit, the solar electrolysis power source as in one embodiment of the present invention. Consequently, the solar electrolysis power source does not depend on a hydrogen-dispensing infrastructure that has not been developed yet. Furthermore, the solar electrolysis power source does not depend on the delivery of hydrogen gas to the place of the power production. Moreover, the hazardous process of filling hydrogen storage tank has been eliminated. By using the solar electrolysis power source as in one embodiment of the present invention, electricity may be produced without burning fossil fuels, which provides further advantages over the prior art.

An embodiment of the present invention further comprises an AC power source that may be used to provide power for the electrolysis of water to continue hydrogen production when no solar energy is available, for example, during nighttime or on cloudy days.

Referring now to FIG. 1, a schematic view of a solar electrolysis power source 10 is illustrated according to one embodiment of the present invention. The solar electrolysis power source 10 may include a solar panel 20, a water tank 90, an electrolysis unit 30, a hermetically sealed compressor 40, a hydrogen tank 50, and a fuel cell 60. The solar electrolysis power source 10 may further include a system controller 70 and an AC power source 80. The electrolysis unit 30 facilitates the electrolysis of water and may include an electrolysis chamber 31, a cathode (negative electrode) 32, an anode (positive electrode) 33, a pH sensor 34, a water level sensor 35, a water fill inlet 36 including a water fill valve 361, an electrolyte tank 91, an electrolyte fill inlet 37 including an electrolyte fill valve 371, an oxygen vent 38 including an oxygen vent valve 381, and a hydrogen vent 39. The electrolysis chamber 31 may include an oxygen chamber 311 and a hydrogen chamber 312. The anode 33 may be located within the oxygen chamber 311, the cathode 32 may be located within the hydrogen chamber 312, and the pH sensor 34 may be positioned within the electrolysis chamber 31, preferably between the oxygen chamber 311 and the hydrogen chamber 312. The water tank 90 that is filled with water may be connected with the electrolysis chamber 31 via the water fill inlet 36 and the water fill valve 361. Instead of the water tank 90, any other available source of water may be used. The electrolyte tank 91 that is filled with an electrolyte, for example, sulfuric acid, may be connected with the electrolysis chamber 31 via the electrolyte fill inlet 37 and the electrolyte fill valve 371. The hydrogen tank may include a pressure gauge 53.

The solar panel 20 may be connected via the system controller 70 with the cathode 32 and the anode 33 of the electrolysis unit 30. The hydrogen vent 39 of the electrolysis unit 30 may be connected to the hermetically sealed compressor 40. The hermetically sealed compressor 40 may be connected via a hydrogen tank fill valve 51 to the hydrogen tank 50. The hydrogen tank may be connected via a hydrogen tank output valve 52 with the fuel cell 60. Furthermore, the AC power source 80 providing preferably a 120 V AC input may be connected to the system controller 70 in addition to the solar panel 20. The system controller 70 may be connected via a data and control bus 71 with the pH sensor 34, with the pressure gauge 53 of the hydrogen tank 50, with the hermetically sealed compressor 40, with water fill valve 361, with the electrolyte fill valve 371, with the oxygen vent valve 381, with the water level sensor 35, with the hydrogen tank fill valve 51, and with the hydrogen output valve 52.

The solar panel 20 may receive solar rays 21 during daylight hours and may provide electrical energy to the electrolysis unit 30. Electrical energy is needed for electrolysis of water that takes place in the electrolysis unit 30. During nighttime hours when solar rays 21 are not available, the AC power source 80 may be used as energy source for the electrolysis of water. The electrical energy provided by either the solar panel 20 or the AC power source 80 is transmitted via the system controller 70 to the electrolysis unit 30 such that a negative charge is created at the cathode 32 and a positive charge is created at the anode 33. The electrolysis chamber 31 may be filled with water from the water tank 90 or any other source of water via the water fill inlet 36 and the water fill valve 361 up to a preset level. The water level in the electrolysis chamber may be monitored and controlled by the system controller 70. The system controller 70 may be connected with the water level sensor 35 and the water fill valve 361. The water level may be adjusted by opening and closing the water fill valve 361. For example, when the water level reaches a preset minimum, the water fill valve 361 is opened to allow more water to flow into the electrolyte chamber 31 through the water fill inlet 36. Once a preset high water level is reached, the water fill valve 361 will be closed again. The system controller 70 may further monitor the pH level of the water. The system controller 70 may send signals over the data and control bus 71 to the electrolyte fill valve 371 to open or close the valve 371. By opening the electrolyte fill valve 371, an electrolyte, preferably sulfuric acid, may be added from the electrolyte tank 91 through the electrolyte fill inlet 37 to the water inside the electrolyte chamber 31 to obtain and maintain slightly acidic water. The water in the electrolyte chamber 31 needs to be slightly acidic with a pH value between 6 and 7 to allow transfer of charge between the cathode 32 and the anode 33. The electrical energy provided to the electrodes (cathode 32 and anode 34) stimulates the electrolysis of water, which produces oxygen gas at the anode 33 and hydrogen gas at the cathode 32. The oxygen gas may be collected in the oxygen chamber 311 and the hydrogen gas may be collected in the hydrogen chamber 312. The oxygen gas collected in the oxygen chamber 311 may be vented to the outside atmosphere through the oxygen vent 38 by opening the oxygen vent valve 381. The oxygen vent valve may be controlled by the system controller 70. The hydrogen gas collected in the hydrogen chamber 312 may be directed through the hydrogen vent 39 to the hermetically sealed compressor 40. The hermetically sealed compressor 40 may then pump the hydrogen gas into the hydrogen tank 50 for storage. The pressure inside the hydrogen tank 50 may be monitored by the pressure gauge 53 that is connected to the system controller 70. When the hydrogen tank 50 achieves maximum pressure, the system controller 70 causes the hydrogen tank fill valve 51 to close and disconnects the energy supply (the solar panel 20 or the AC power source 80) in order to stop the production of hydrogen gas. When electrical power is required for an application, such as operation of a vehicle or of a power appliance, the hydrogen tank output valve 52 may be opened to allow hydrogen gas to enter the fuel cell 60. This process may also be monitored and controlled by the system controller 70. The fuel cell 60 will then provide power to be used.

Figure 2:
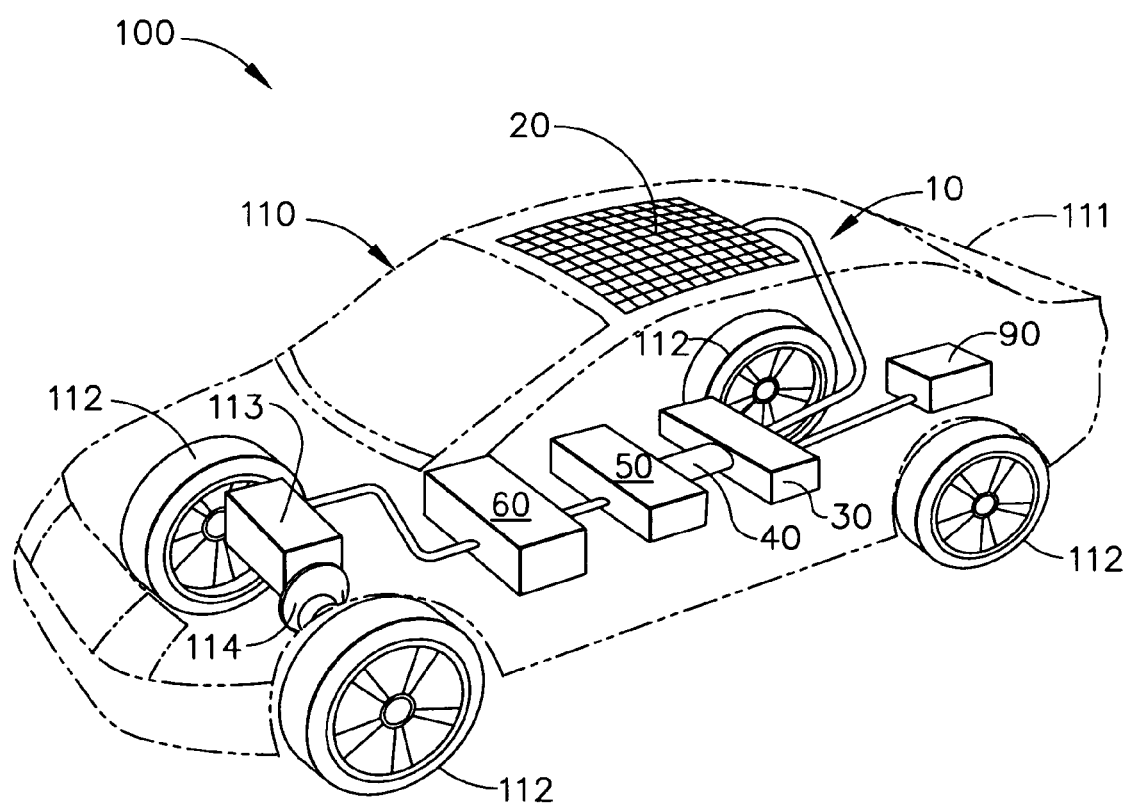
FIG. 2 is a perspective view of a hydrogen-powered vehicle according to another embodiment of the present invention.

One application of the solar electrolysis power source 10 as described above and as shown in FIG. 1 may be its use in a hydrogen-powered vehicle 100. Referring now to FIG. 2, a perspective view of a hydrogen-powered vehicle 100 is illustrated according to one embodiment of the present invention. The hydrogen-powered vehicle 100 may include a frame 110 including a body 111, wheels 112, the solar electrolysis power source 10, an electric motor 113, and a transmission 114. The wheels 112 may be attached to the frame 110. The solar electrolysis power source 10 may provide electrical power that may be used to power the electric motor 113. The electric motor 113 may be connected with the transmission 114. The transmission 114 connects the electric motor 113 with the wheels 112. The solar electrolysis power source 10 as in one embodiment of the present invention and as described above would be the only power source needed to provide power to such a hydrogen-powered vehicle 100. Since the solar electrolysis power source 10 uses hydrogen gas that is hermetically sealed from production to use no refilling of the hydrogen tank 50 would be needed.

A method for generating power by utilizing the electrolysis of water and solar energy may include the steps of: providing a solar electrolysis power source 10 that includes a solar panel 20, an electrolysis unit 30 including an electrolysis chamber 31, a cathode 32, an anode 33, a pH sensor 34, a water level sensor 35, a water fill inlet 36 including a water fill valve 361, a electrolyte fill inlet 37 including a electrolyte fill valve 371, an oxygen vent 38 including an oxygen vent valve 381, a hydrogen vent 39, a hermetically sealed compressor 40, a hydrogen tank 50, a fuel cell 60, and a system controller 70; filling the electrolysis chamber 31 with slightly acidic water; producing electrical energy with the solar panel 20; providing this electrical energy to the cathode 32 and the anode 33, producing oxygen gas and hydrogen gas with the electrolysis of water; pumping the hydrogen gas using the hermetically sealed compressor 40 into the hydrogen tank 50; providing hydrogen gas from the hydrogen tank 50 to the fuel cell 60; generating electrical energy with the fuel cell 60; and powering a vehicle or other equipment. The process of producing power using the solar electrolysis power source 10 may be monitored and controlled by the system controller 70. The generated oxygen gas may be vented to the atmosphere.

Therefore, by providing a solar electrolysis power source 10 that includes a solar energy powered electrolysis unit 30, a hermetically sealed compressor 40, a hydrogen storage tank 50 and a hydrogen powered fuel cell 60, the production, compression, storage and delivery to a fuel cell for production of electricity is provided in one hermetically sealed unit. Consequently, currently existing problems with the production, storage delivery, and refueling of hydrogen can be eliminated. Moreover, by using the solar electrolysis power source 10, electrical energy may be produced without fossil fuels or with minimal use of fossil fuels in a process that is safe, environmentally benign, and cost-effective. Although the solar electrolysis power source 10 has been described for use in hydrogen-powered vehicles, such as automobiles, buses or ships, and for portable power equipment, such as power tools, other applications are possible.

It should be understood, of course, that the foregoing relates to preferred embodiments of the invention and that modifications may be made without departing from the spirit and scope of the invention as set forth in the following claims.

I claim:

1. A solar electrolysis power source, comprising:
   a source of water;
   an electrolysis unit, wherein said electrolysis unit is connected with said source of water and receives water from said source of water, and wherein said electrolysis unit provides the electrolysis of said water and produces hydrogen gas and oxygen gas, wherein said electrolysis unit comprises:
      an electrolysis chamber, wherein said electrolysis chamber is connected with said source of water, and wherein said electrolysis chamber receives water from said source of water;
      a cathode located within said electrolysis chamber, wherein said cathode is connected with said solar panel creating a negative charge at said cathode;
      an anode located within said electrolysis chamber, wherein said anode is connected with said solar panel creating a positive charge at said anode;
      a pH sensor located within said electrolysis chamber;
      a water level sensor located within said electrolysis chamber;
      a water fill inlet including a water fill valve, wherein said water fill inlet connects said electrolysis chamber with said source of water;
      an electrolyte tank containing an electrolyte and including an electrolyte fill inlet and an electrolyte fill valve, wherein said electrolyte fill inlet connects said electrolyte tank with said electrolysis chamber;
a solar panel, wherein said solar panel is connected with said electrolysis unit, and wherein said solar panel receives solar rays and provides electrical energy to said electrolysis unit;
a hermetically sealed compressor, wherein said hermetically sealed compressor is connected with said electrolysis unit, and wherein said hermetically sealed compressor receives said hydrogen gas from said electrolysis unit;
a hydrogen tank, wherein said hydrogen tank is connected with said hermetically sealed compressor, and wherein said hydrogen tank receives said hydrogen gas from said hermetically sealed compressor; and
a fuel cell, wherein said fuel cell is connected with said hydrogen tank, and wherein said fuel cell receives said hydrogen gas from said hydrogen tank.

2. The solar electrolysis power source of claim 1, further comprising a system controller, wherein said system controller is connected with said solar panel, said electrolysis unit, said hermetically sealed compressor, and said hydrogen tank.

3. The solar electrolysis power source of claim 2, further comprising an AC power source, wherein said AC power source is connected with said electrolysis unit, and wherein said AC power source provides electrical energy to said electrolysis unit.

4. The solar electrolysis power source of claim 3, wherein said system controller connects said AC power source with said electrolysis unit.

5. The solar electrolysis power source of claim 2, wherein said hydrogen tank comprises:
a hydrogen tank fill valve, wherein said hydrogen tank fill valve is located between said hermetically sealed compressor and said hydrogen tank;
a hydrogen tank output valve, wherein said hydrogen tank output valve is located between said hydrogen tank and said fuel cell; and
a pressure gauge, wherein said pressure gauge indicates the pressure of said hydrogen gas stored inside said hydrogen tank.

6. The solar electrolysis power source of claim 5, further comprising a data and control bus, wherein said data and control; bus connects said system controller with said pH sensor, said water level sensor, said water fill valve, said electrolyte fill valve, said oxygen vent valve, said hydrogen tank fill valve, said hydrogen tank output valve, said pressure gauge of said hydrogen tank, and said hermetically sealed compressor.

7. The solar electrolysis power source of claim 2, wherein said system controller controls said electrolyte control valve in response to said pH sensor to add electrolyte to said water contained within said electrolysis chamber to maintain a pH value between 6 and 7.

8. The solar electrolysis power source of claim 1, and further comprising:
an oxygen vent including an oxygen vent valve, wherein said oxygen vent connects said electrolysis chamber with the outside atmosphere; and
a hydrogen vent, wherein said hydrogen vent connects said electrolysis chamber with said hermetically sealed compressor.

9. A solar electrolysis power source, comprising:
a source of water;
an electrolysis unit, wherein said electrolysis unit is connected with said source of water and receives water from said source of water, and wherein said electrolysis unit provides the electrolysis of said water and produces hydrogen gas and oxygen gas; wherein said electrolysis unit comprises:
an electrolysis chamber including an oxygen chamber and a hydrogen chamber, wherein said electrolysis chamber is connected with said source of water, and wherein said electrolysis chamber receives water from said source of water;
a cathode located within said hydrogen chamber, wherein said cathode is connected with said solar panel creating a negative charge at said cathode;
an anode located within said oxygen chamber, wherein said anode is connected with said solar panel creating a positive charge at said anode;
a pH sensor located within said electrolysis chamber;
a water level sensor located within said electrolysis chamber;
a water fill inlet including a water fill valve, wherein said water fill inlet connects said electrolysis chamber with said source of water;
an electrolyte tank containing an electrolyte and including an electrolyte fill inlet and an electrolyte fill valve, wherein said electrolyte fill inlet connects said electrolyte tank with said electrolysis chamber;
a solar panel, wherein said solar panel is connected with said electrolysis unit, and wherein said solar panel receives solar rays and provides electrical energy to said electrolysis unit;
an AC power source, wherein said AC power source is connected with said electrolysis unit, and wherein said AC power source provides electrical energy to said electrolysis unit;
a hermetically sealed compressor, wherein said hermetically sealed compressor is connected with said electrolysis unit, and wherein said hermetically sealed compressor receives said hydrogen gas from said electrolysis unit;
a hydrogen tank, wherein said hydrogen tank is connected with said hermetically sealed compressor, and wherein said hydrogen tank receives said hydrogen gas from said hermetically sealed compressor;
a fuel cell, wherein said fuel cell is connected with said hydrogen tank, and wherein said fuel cell receives said hydrogen gas from said hydrogen tank; and
a system controller, wherein said system controller is connected with said solar panel, said AC power source, said electrolysis unit, said hermetically sealed compressor, and said hydrogen tank.

10. The solar electrolysis power source of claim 9, and further comprising:
an oxygen vent including an oxygen vent valve, wherein said oxygen vent connects said oxygen chamber of said electrolysis chamber with the outside atmosphere; and
a hydrogen vent, wherein said hydrogen vent connects said hydrogen chamber of said electrolysis chamber with said hermetically sealed compressor.

11. The solar electrolysis power source of claim 9, further comprising:
a hydrogen tank fill valve, wherein said hydrogen tank fill valve is located between said hermetically sealed compressor and said hydrogen tank;
a hydrogen tank output valve, wherein said hydrogen tank output valve is located between said hydrogen tank and said fuel cell;
a pressure gauge, wherein said pressure gauge indicates the pressure of said hydrogen gas stored inside said hydrogen tank; and a data and control bus, wherein said data and control bus connects said system controller with said pH sensor, said water level sensor, said water fill valve, said electrolyte fill valve, said oxygen vent valve, said hydrogen tank fill valve, said hydrogen tank output valve, said pressure gauge of said hydrogen tank, and said hermetically sealed compressor.

12. The solar electrolysis power source of claim 9, wherein said source of water is a water tank for holding water.

13. A solar electrolysis power source, comprising:
a water tank holding water;
an electrolysis unit, wherein said electrolysis unit is connected with said water tank and receives said water from said water tank, wherein said electrolysis unit facilitates the electrolysis of said water and produces hydrogen gas and oxygen gas, and wherein said electrolysis unit comprises:
   an electrolysis chamber including an oxygen chamber and a hydrogen chamber, wherein said electrolysis chamber is connected with said water tank and wherein said electrolysis chamber receives water from said water tank;
   a cathode located within said hydrogen chamber, wherein said cathode is connected with said solar panel creating a negative charge at said cathode;
   an anode located within said oxygen chamber, wherein said anode is connected with said solar panel creating a positive charge at said anode;
   a pH sensor located within said electrolysis chamber;
   a water level sensor located within said electrolysis chamber;
   a water fill inlet including a water fill valve, wherein said water fill inlet connects said electrolysis chamber with said source water tank;
   an electrolyte tank containing an electrolyte and including an electrolyte fill inlet and an electrolyte fill valve, wherein said electrolyte fill inlet connects said electrolyte tank with said electrolysis chamber;
   an oxygen vent including an oxygen vent valve, wherein said oxygen vent connects said oxygen chamber of said electrolysis chamber with the outside atmosphere; and
   a hydrogen vent, wherein said hydrogen vent connects said hydrogen chamber of said electrolysis chamber with said hermetically sealed compressor;
a solar panel, wherein said solar panel is connected with said electrolysis unit, and wherein said solar panel receives solar rays and provides electrical energy to said electrolysis unit;
an AC power source, wherein said AC power source is connected with said electrolysis unit and wherein said AC power source provides electrical energy to said electrolysis unit;
a hydrogen tank, wherein said hydrogen tank is connected with said hermetically sealed compressor, wherein said hydrogen tank receives said hydrogen gas from said hermetically sealed compressor, and wherein said hydrogen tank comprises:
   a hydrogen tank fill valve, wherein said hydrogen tank fill valve is located between said hermetically sealed compressor and said hydrogen tank;
   a hydrogen tank output valve, wherein said hydrogen tank output valve is located between said hydrogen tank and said fuel cell; and
   a pressure gauge, wherein said pressure gauge indicates the pressure of said hydrogen gas stored inside said hydrogen tank;

a fuel cell, wherein said fuel cell is connected with said hydrogen tank, and wherein said fuel cell receives said hydrogen gas from said hydrogen tank;
a system controller, wherein said system controller is connected with said solar panel, said AC power source, said electrolysis unit, said hermetically sealed compressor, and said hydrogen tank; and
a data and control bus, wherein said data and control bus connects said system controller with said pH sensor, said water level sensor, said water fill valve, said electrolyte fill valve, said oxygen vent valve, said hydrogen tank fill valve, said hydrogen tank output valve, said pressure gauge of said hydrogen tank, and said hermetically sealed compressor.

14. The solar electrolysis power source of claim 13, wherein said oxygen is collected in said oxygen chamber of said electrolysis chamber.

15. The solar electrolysis power source of claim 13, wherein said hydrogen is collected in said hydrogen chamber of said electrolysis chamber.

16. The solar electrolysis power source of claim 13, wherein the pH value of said water contained in said electrolysis chamber is maintained between 6 and 7 by adding said electrolyte from said electrolyte tank.

17. A hydrogen-powered vehicle, comprising:
a solar electrolysis power source that is mounted on said vehicle, wherein said solar electrolysis power source comprises:
   a water tank holding water;
   an electrolysis unit, wherein said electrolysis unit is connected with said water tank and receives said water from said water tank, and wherein said electrolysis unit provides the electrolysis of said water and produces hydrogen gas and oxygen gas wherein said electrolysis unit comprises:
      an electrolysis chamber, wherein said electrolysis chamber is connected with said source of water, and wherein said electrolysis chamber receives water from said source of water;
      a cathode located within said electrolysis chamber, wherein said cathode is connected with said solar panel creating a negative charge at said cathode;
      an anode located within said electrolysis chamber, wherein said anode is connected with said solar panel creating a positive charge at said anode;
      a pH sensor located within said electrolysis chamber;
      a water level sensor located within said electrolysis chamber;
      a water fill inlet including a water fill valve, wherein said water fill inlet connects said electrolysis chamber with said source of water;
      an electrolyte tank containing an electrolyte and including an electrolyte fill inlet and an electrolyte fill valve, wherein said electrolyte fill inlet connects said electrolyte tank with said electrolysis chamber;
   a solar panel, wherein said solar panel is connected with said electrolysis unit, and wherein said solar panel receives solar rays and provides electrical energy to said electrolysis unit;
   an AC power source, wherein said AC power source is connected with said electrolysis unit, and wherein said AC power source provides electrical energy to said electrolysis unit;
   a hydrogen tank, wherein said hydrogen tank is connected with said hermetically sealed compressor, and wherein said hydrogen tank receives said hydrogen gas produced by the electrolysis unit;

a fuel cell, wherein said fuel cell is connected with said hydrogen tank, and wherein said fuel cell receives said hydrogen gas from said hydrogen tank; and a system controller, wherein said system controller is connected with said solar panel, said AC power source, said electrolysis unit, said hermetically sealed compressor, and said hydrogen tank.

18. The hydrogen-powered vehicle of claim 17, wherein said electrical energy provided by said AC power source stimulates the electrolysis of said water in said electrolysis chamber and produces said oxygen gas at said anode and said hydrogen gas at said cathode.

19. The hydrogen-powered vehicle of claim 17, wherein said hydrogen gas is collected in said hydrogen chamber of said electrolysis chamber.

20. The hydrogen-powered vehicle of claim 17, wherein said oxygen is collected in said oxygen chamber of said electrolysis chamber.

21. A method for generating power by utilizing the electrolysis of water and solar energy, comprising the steps of:
providing a solar panel that receives solar rays and generates electrical energy;
providing a source of water;
connecting an electrolysis unit including an anode and a cathode with said solar panel and said source of water;
filling said electrolysis unit with said water;
adding an electrolyte to said water in said electrolysis unit;
maintaining a pH value of said water in said electrolysis unit between 6 and 7;
providing said electrical energy generated by said solar panel to said anode and said cathode of said electrolysis unit;
producing oxygen gas and hydrogen gas with said electrolysis unit;
connecting a hermetically sealed compressor with said electrolysis unit;
directing said hydrogen gas to said hermetically sealed compressor;
providing a hydrogen tank and connecting said hydrogen tank with said hermetically sealed compressor;
pumping said hydrogen gas into said hydrogen tank with said hermetically sealed compressor;
connecting a fuel cell with said hydrogen tank;
delivering said hydrogen gas from said hydrogen tank to said fuel cell; and
generating electrical energy with said fuel cell.

22. The method for generating power by utilizing the electrolysis of water and solar energy of claim 21, further comprising the step of powering a vehicle with said electrical energy generated by said fuel cell.

23. A method for generating power by utilizing the electrolysis of water and solar energy, comprising the steps of:
providing a solar electrolysis power source including:
a source of water;
an electrolysis unit, wherein said electrolysis unit is connected with said source of water and receives water from said source of water, and wherein said electrolysis unit provides the electrolysis of said water and produces hydrogen gas and oxygen gas;
a solar panel, wherein said solar panel is connected with said electrolysis unit, and wherein said solar panel receives solar rays and provides electrical energy to said electrolysis unit;
an AC power source, wherein said AC power source is connected with said electrolysis unit, and wherein said AC power source provides electrical energy to said electrolysis unit;
a hermetically sealed compressor, wherein said hermetically sealed compressor is connected with said electrolysis unit, and wherein said hermetically sealed compressor receives said hydrogen gas from said electrolysis unit;
a hydrogen tank, wherein said hydrogen tank is connected with said hermetically sealed compressor, and wherein said hydrogen tank receives said hydrogen gas from said hermetically sealed compressor;
a fuel cell, wherein said fuel cell is connected with said hydrogen tank, and wherein said fuel cell receives said hydrogen gas from said hydrogen tank; and
a system controller, wherein said system controller is connected with said solar panel, said AC power source, said electrolysis unit, said hermetically sealed compressor, and said hydrogen tank;
generating electrical energy with said solar panel;
filling said electrolysis unit with said water;
maintaining a pH value of said water in said electrolysis unit between 6 and 7;
providing said electrical energy generated by said solar panel to said electrolysis unit;
producing oxygen gas and hydrogen gas with said electrolysis unit through electrolysis of said water;
directing said hydrogen gas to said hermetically sealed compressor;
pumping said hydrogen gas into said hydrogen tank with said hermetically sealed compressor;
delivering said hydrogen gas from said hydrogen tank to said fuel cell; and
generating electrical energy with said fuel cell.

24. The method for generating power by utilizing the electrolysis of water and solar energy of claim 23, further comprising the step of venting said oxygen gas into the atmosphere.

25. The method for generating power by utilizing the electrolysis of water and solar energy of claim 23, further comprising the step of powering a portable power tool with said electrical energy generated by said fuel cell.

26. The method for generating power by utilizing the electrolysis of water and solar energy of claim 23, further comprising the steps of:
providing an AC power source;
connecting said AC power source with said electrolysis unit; and
providing electrical energy to said electrolysis unit.

* * * * *

UNITED STATES PATENT AND TRADEMARK OFFICE
CERTIFICATE OF CORRECTION

PATENT NO. : 7,459,064 B2 Page 1 of 1
APPLICATION NO. : 10/721928
DATED : December 2, 2008
INVENTOR(S) : Christopher M. Anderson It is certified that error appears in the above-identified patent and that said Letters Patent is hereby corrected as shown below:

Column 15, Line 32, delete "control; bus", insert --control bus--

Signed and Sealed this

Tenth Day of August, 2010

David J. Kappos
*Director of the United States Patent and Trademark Office*